United States Patent [19]

Zottnik

[11] Patent Number: 4,638,289
[45] Date of Patent: Jan. 20, 1987

[54] ACCIDENT DATA RECORDER

[75] Inventor: Edmund Zottnik, Gerlingen, Fed. Rep. of Germany

[73] Assignee: Licentia Patent-Verwaltungs-GmbH, Fed. Rep. of Germany

[21] Appl. No.: 676,193

[22] PCT Filed: Feb. 24, 1984

[86] PCT No.: PCT/DE84/00041
§ 371 Date: Oct. 23, 1984
§ 102(e) Date: Oct. 23, 1984

[87] PCT Pub. No.: WO84/03359
PCT Pub. Date: Aug. 30, 1984

[30] Foreign Application Priority Data

Feb. 26, 1983 [DE] Fed. Rep. of Germany ....... 3306814
Feb. 17, 1984 [DE] Fed. Rep. of Germany ....... 3405757

[51] Int. Cl.$^4$ .................... B60Q 11/00; G01P 15/125; G06F 15/50
[52] U.S. Cl. .............................. 340/52 H; 73/517 R; 73/517 A; 364/426
[58] Field of Search .................... 340/22, 52 R, 52 H; 73/517 R; 364/426, 424; 377/16, 20, 26

[56] References Cited

U.S. PATENT DOCUMENTS 3,226,981  1/1966  Mullins ........................... 73/517 R
3,781,824 12/1973  Caiati .............................. 340/22 X
4,180,724 12/1979  Councilman et al. ............. 377/16

Primary Examiner—James L. Rowland
Assistant Examiner—Anne Marie F. Capati
Attorney, Agent, or Firm—McGlew and Tuttle

[57] ABSTRACT

An accident data recorder for short-time recordation and storage of data and events relating to an accident of motor vehicles, comprising pickups for sensing, for example, wheel revolutions to determine the travelled distance and speed of the vehicle. In addition to these wheel sensors, capacitance-based acceleration sensors are provided whose output signals along with the output signals of the wheel sensors and with other status data relating to the operation of the vehicle, are continuously recorded at storage locations of a fixed storage. For this purpose, an addressing logic is provided which operates in a closed counting loop and, as soon as a final address is reached, jumps back to the starting address to overwrite the initially stored data. This cyclic data storage is interrupted by the occurrence of a trigger event defining an accident, with the result that the last recorded data, including a predetermined after-travel time, are freezed.

14 Claims, 5 Drawing Figures

ACCIDENT DATA RECORDER

FIELD AND BACKGROUND OF THE INVENTION

The invention relates to an accident data recorder. When mounted in a motor vehicle, accident data, recorders are intended to record and preserve for later use, data or conditions which were present or occur within a limited period of time before the accident and are relevant for investigating the accident. They are known in a variety of designs, substantially as mechanically operating short distance recorders.

For example, short distance recorders (manufacturer Kienzle) or color disc tachographs (Company Hasler AG) comprise a drive from the transmission through a flexible shaft for graphically/mechanically recording the rotation of the drive wheels. What can be recorded is only the speed before the accident without any additional data, and it proved particularly problematic with such mechanical short distance recorders recording the travelled distance or the speed, for example, by scratching a curve into an ink-coated disc, that no data can be obtained after the wheels got locked, thus just when a thorough data recording is needed.

Further known are so-called tachographs with an electro-mechanical data storage, using plastic films in the form of a circle and capable of recording a great amount of data due to an arrangement of discs one above the other. Here again, no values are recorded after the wheels are locked.

It may also be considered known to store data in a short time recorder electromagnetically or in a purely electrical way, by using a preferably multitrack endless magnetic tape driven in response to travel, or continuously, and storing pulses or speed-dependent signals, or by using a counter for electronically evaluating pulses delivered from a wheel-driven transmitter and storing the pulse times.

In any case, in all short time recorders having to perform some mechanical movement, the problem arises that no unperturbed operation can be ensured through a sought minimum operating time, and that, on the other hand, short time accident data recorders intrinsically must be designed to continuously receive a great amount of data which practically must exceed the capacity of the recorder and become superfluous after the predetermined period of time if no accident occurs. In consequence, an accident data recorder must operate continuously but be so designed that from a certain point of time, which simply cannot be predicted and may be will never occur, data concerning an event and relating to a preceding period of time are made available for evaluation.

Finally, a device is known for registering operating data of a vehicle (German Pat. No. 23 22 299) working as an accident data recorder and eventually storing the data in digital form in at least one intermediate memory. This prior art device comprises a not particularly specified acceleration meter for lengthwise accelerations and an acceleration meter for transverse accelerations, and is designed to pick up wheel rotation by means of an inductive sensor and after amplification, convert the detected values to a digital signal. The acceleration meters are followed by amplifiers for high and low gain, so that altogether four analog measured acceleration values are obtained which are supplied, through an analog multiplexer and an intermediate sample-and-hold circuit, to a single analog-to-digital converter and therefrom, under the control of the corresponding multiplexed control signal transmitter, to two shift registers for accelerations, in a manner such that a first register contains the data for small acceleration, and the other register the data for high acceleration. A third shift register receives the pulses of the travelling speed of the vehicle. Upon supplying new data to the shift registers, which is effected in a sequence that is timed by the control signal generator, the respective oldest data are automatically lost. The prior art device thus starts from the assumption that with a sufficiently large amount of shift register stages, upon a collision signal and failure of the timing pulses, still a satisfactory amount of digital data remains in the registers, relating to the period before the collision signal. This, however, requires extremely high storage capacity, for unfavorable accident situations (high speeds). The collision signal is obtained in an acceleration detector by comparing the lengthwise and transverse acceleration signals which are always a little amplified.

In a development of the prior art device, a fixed storage may be connected through switches to the shift registers, for nonerasably storing the data contained in the shift registers. Then, upon an impact signal obtained in the acceleration detector, the fixed storage initially takes up the contents of a first shift register by closing the connecting switch, for a period of time extending somewhat beyond the instant of the impact, so that even after-accident data may become stored. In this connection, however, a problem arises with the prior art device, that after-accident data supplied to the other provided shift registers, can on no account any longer be taken over into the fixed storage, since the control signal generator prevents further data from being stored in the registers which are not connected to the fixed storage. The accident, however, happens in real time and the registration must take place as the data comes in. That is why all the after-accident data which have not been supplied to the first shift register, get lost.

Another problem with the prior art device is that nothing specific is taught about the construction of the acceleration sensors, so that it must be assumed that they do not operate with a satisfactory sensitivity. Lack of sensitivity can also be assumed in view of the necessary analog-to-digital conversion, which assumption seems further to be justified by the association, deemed necessary, of each of the acceleration meters with two analog amplifiers having unequal gains.

The breaking down of the data by the input analog multiplexer results in a displacement in time. Even if an integration should follow, such an integration may be effected in each instance only over one quart of the available timing period, so that already in the data conversion, provided at the analog multiplexer associated with four data inputs as mentioned, three quarters of the data are lost.

Even though that is not disclosed in detail, the detection of a trigger event (impact signal) by the acceleration detector can be defined only as exceeding fixedly predetermined values of the lengthwise or the transverse accelerations. In consequence, because of the omitted differentiated evaluation of the acceleration data, such as a computation of values resulting from a lengthwise and transverse acceleration, most accidents do not trigger a response, for example in instances of disregarded overtaking where an impact produces only minimum transverse accelerations, no lengthwise acceleration, but significant angular accelerations, especially if the friction between the wheel and the road is reduced. However, since the timing signal is interrupted only upon the occurrence of an impact signal, the significant data may get lost in many cases, particularly in accidents where people are involved.

The following is another example of the disadvantages of the prior art device. Since only the lengthwise and the transverse acceleration are recorded, two-dimensional movement of the vehicle cannot be determined. During a skid, a vehicle turns about its vertical axis, and the lengthwise accelerations turn into a transverse one. Only by including the angular acceleration about the vertical axis into the computation, can the determination of an erroneous locus be avoided.

Since only instantaneous values spaced by the selected timing rate are available for the evaluation, and with the differential variations of the accelerations being considerable (breaking-impact), the values cannot give any information on the average acceleration which is wanted for the computation. It must rather be assumed that the stored values are related to the actual ones only fortuitously.

A further problem is that no critical time considerations, such as a correlation with the absolute time, are taken into account, so that in the event of a hit-and-run accident, for example, no interrelations in time can be proved. Also, a storage of disturbances in the system is not provided, tampering with the power supply, failure of the sensors or signal lines cannot be recorded; there is no proper safety against sabotage. The same goes for complex functions such as self testing, self adjusting, etc.

SUMMARY OF THE INVENTION

The present invention is based on the finding that a chronological breakdown of a complex collision in order to assign the culpability is imperative, and includes also the effects produced by acceleration. This is a requirement which cannot be satisfied by a travel responsive recording alone, since in such instances, the blank periods between recordings, which may be caused by wheel locking, for example, are more important than the recorded ones. It is further of primary importance to obtain the recordal in real time, since this both makes sure that the recorded data will be directly interconnected and related in time, and serves as the sole remaining conclusive circumstantial evidence of any complicity if more recordings are available.

As compared to the prior art, the inventive accident data recorder having the features according to the basic claim has the advantage that the entire sequence of motions of the vehicle during a sufficiently long period of time before the occurrence of the accident is accurately recorded and becomes non-erasably stored at the instant the accident occurs. The design is focused not only on the speed of the vehicle which may be determined by measuring the wheel revolutions, but also on picking up and storing highly accurate acceleration data and evaluating them at the same time as a basis for computing the instant at which an accident occurred.

All the stored information and data are referred to a time base which is provided at a reference input independent of the road and traffic. The time base furnishes both timing pulses for a time counter, and the clock rate for the entire system of data acquisition and storage.

The invention accident data recorder is so designed that all the events occurring within a period of time between an instant sufficiently preceding an accident and an adequately later instant following the accident are recorded in all details with a high accuracy, and so narrowly quantized that a gapless representation of a sequence of counts both before and after the accident can be obtained and correspondingly evaluated.

The decision on whether the data which normally continue to be overwritten in a continuous cycle are to be preserved is independent of any contemplation by the driver, of course; on the basis of the conditions supplied by the external sensors, the accident data recorder ascertains that an accident occurred and freezes the data belonging thereto; at the same time, upon the expiration of an additional-travel period, a new secondary loop is defined for filling storage locations in a fixed storage, thus a standby time is made available for monitoring the critical time after a collision.

It is further advantageous that a certain sequence of so-called status conditions A is monitored and stored in recurrent short time intervals, such as every 100 ms, while other status conditions B are registered in longer intervals, such as every 500 ms, to save storage locations.

With the provisions covered by the dependent claims, advantageous developments and improvements of the accident data recorder defined in the basic claim are obtained.

BRIEF DESCRIPTION OF THE DRAWINGS

One embodiment of the invention is shown in the drawings and described in more detail in the following. In the drawings.

DESCRIPTION OF THE PREFERRED EMBODIMENTS

Figure 1:
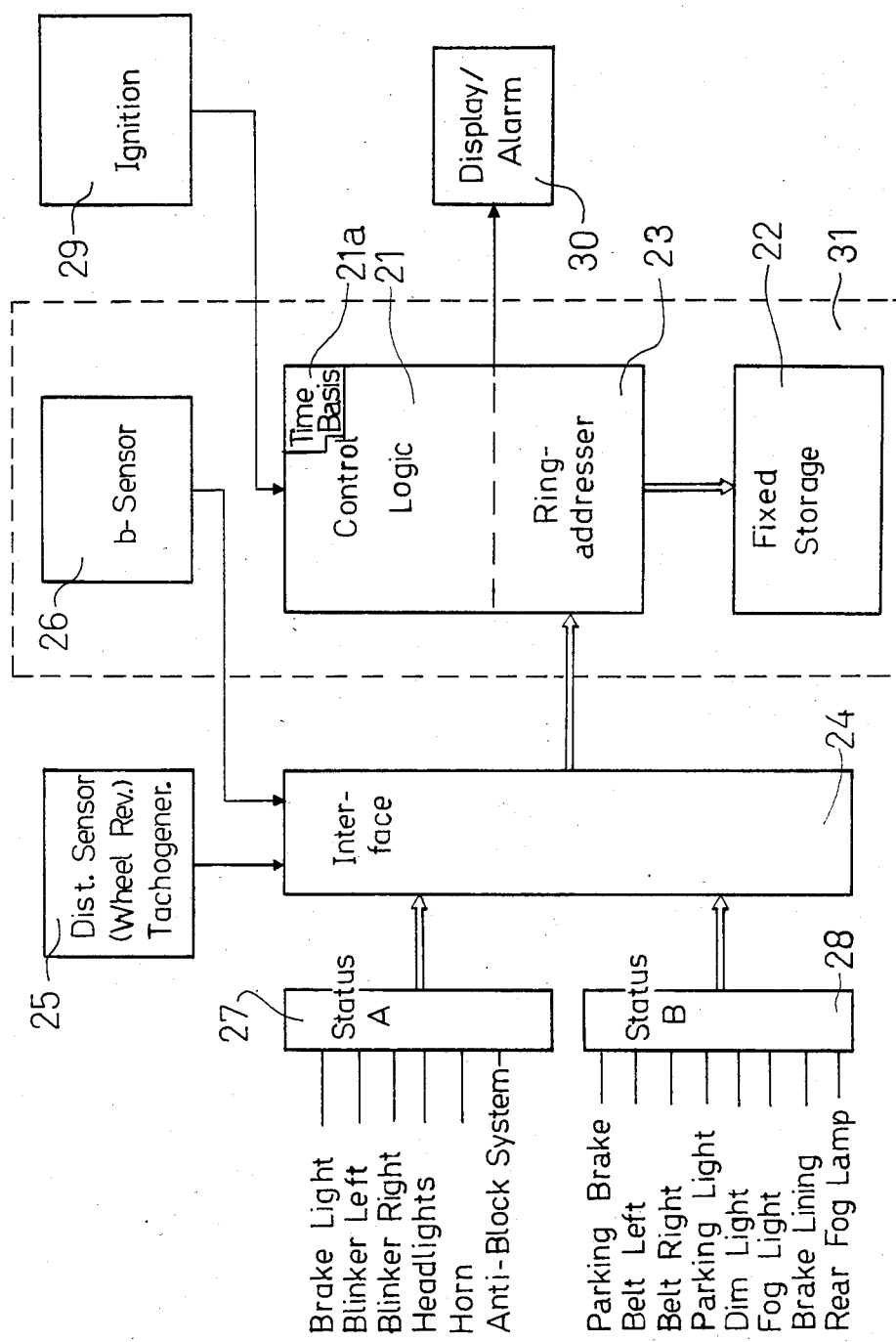
FIG. 1 is a block diagram of the most important component parts of the inventive accident data recorder, also showing the mutual association of the individual structural elements by which the data flow is characterized.

The invention includes a central control logic circuit 21 which, in the design of FIG. 1, is supplied with data to be recorded and provides storing of the data in a fixed storage 22 while using an addressing logic 23 which also may be termed a ring addresser, ring storage, or cyclically rotating address counter. and which establishes a new address in respective predetermined time intervals to operate in every instance on a storage area or a storage location in fixed storage 22 and transfer thereto for storage all the data supplied from an interface 24.

The addressing logic, termed a ring addresser in the following, operates cyclically in a closed loop and, after a predetermined cycle duration or recording time which is variable, readdresses the storage locations which have been addressed at the start of the cycle and released for data storing, so that new data are written over the earlier data. All the data are supplied through interface 24 from a tachogenerator or displacement sensor preferably furnishing a predetermined number of pulses per wheel revolution, for each wheel separately if desired, and thus permitting with reference to the respective time base data to determine the travelled distance or the corresponding speed. This external sensor is indicated at 25 in FIG. 1. Reference number 26 designates an acceleration sensor of a design such that for measuring the wheel rotation, an entirely independent quantity is introduced which is available in all critical instances and capable of picking up an acceleration to which the vehicle is subjected. This b sensor is a capacitive system in which the capacitor surfaces are designed as transverse beams and mounted in a way such that the inertia forces in the respective selected axis act directly perpendicularly to the two axes. The construction and function of acceleration sensor 26 is discussed in more detail hereinafter.

In addition to the travel speed data and the acceleration data, a plurality of further desired data, basically of any kind yet relevant to the evaluation of an accident, are furnished for processing and storing, of which so called status conditions A and status conditions B are enumerated as typical representatives in the showing of FIG. 1. As indicated in FIG. 1, the status A data comprise, for example, the brake light, blinker left, blinker right, headlight, horn, data on ABS effects (anti-block system). The status A data are to represent all functions of the vehicle which are relevant for traffic behavior and are present in digital form or can be converted thereto, and which must be available in highest resolution. They are supplied to the storage in short time intervals, such as of 100 ms, through the ring addresser as are advantageously also the other data on the function of the vehicle, while the status B data comprise all those functions important for the operation of the vehicle which need not be supplied with a highest resolution and thus are stored in time intervals of 500 ms, for example.

The status A and status B blocks 27 and 28 may be suitably designed for preparing the data transmitted thereto through interface 24, thus, for example also as converters of physical quantities into electrical output quantities, with most of the status A and status B data being supposed to be simple yes-no conditions, for example, whether or not the horn has been actuated, so that the outputs of the respective logic elements are in either their zero or their one state.

Further provided is an ignition block 29 supplying to the control logic circuit of the accident data recorder information that the ignition has been connected, and finally, the control logic circuit itself comprises a display or alarm block 30 which is designed to effect a proper indication calling for checking and/or an evaluation as soon as a sequence of stored data becomes stuck or frozen.

Operation

The basic operation of the inventive data recorder is such that a predetermined number of addressable storage locations or storage areas is present in fixed storage 22. In a practical embodiment, about as many storage locations may be provided in the fixed storage or basic storage, as are necessary to put down three times data for a recording time period of 60 seconds each, with a recording time 60 seconds proving reasonable and also sufficient for an operation. Such a period of time corresponds in urban traffic at 50 km per hour to a traveled distance of 833 meters, in highway traffic at 100 km per hour to a travelled distance of 1667 meters, and on an express highway at assumed 200 km per hour to a traveled distance of 3333 meters, over which distance then an uninterrupted proof may be furnished of all the relevant functions of the vehicle.

The recording, thus setting down of the data in the fixed storage, is a function of time and is effected, to a predetermined extent, so that, as just mentioned, the recorded travelled distances augment in proportion to the speed.

As the time base 21a, a quartz time base is provided which is independent of the rest of the system and has a minimum power requirement and is equipped with an emergency drive with a buffer battery, since this is the sole part of the circuitry which must not be switched off.

This time base 21a furnishes both the clock pulses for a separate time counter and the clock rate of the system for the entire control and storage operation, it being within the scope of the invention, of course, that also microprocessors, single purpose counters, or similar equipment is provided to effect the control and ensure the general operation of the system.

The fixed storage 22 is usually designed as an RAM. The addressing logic or ring addresser as a counting loop determines the limited storage extent of a recording frequency (duration of one minute for example) and defines a starting address up to the end address, provides for the entry of all data relevant to the vehicle at the individual storage locations and upon reaching the end address, jumps back to the starting address, so that in normal travel, the data in the fixed storage are cyclically renewed by new entries through the counting loop.

This cyclic operation of the counting loop is interrupted only by the occurrence of a trigger event which is computed by the control logic and interpreted as an accident. This may be done, for example, by continually computing the accelerations reported by the accleration sensor 26 with the predetermined maximum values, and inferring an accident from respective detected disparities. The decision when or whether an accident has occurred can be made with a maximum security, with the respective evaluation criteria being as close as possible to the accelerations occurring during regular travel. To define an accident, it is also possible to make use of further data, in addition to only monitoring the accelerations, for example, a strong retardation in the travel direction without a simultaneous actuation of the brake.

As a result of the direction of the trigger event, the last data, i.e. the data which due to the cyclic process are at that instant stored in the fixed storage, are frozen, or in other words, ring addresser 23 stops further addressing the storage locations belonging to its hitherto existing counting loop. Only the recording still continues for a limited time, such as for half a minute at most, and at least up to the stop of the vehicle.

Thereupon, ring addresser 23 may jump out of this counting loop and define a next counting loop, also for the duration of one minute, with correspondingly addressed further storage locations in fixed storage 22, whereby the storage locations of the first counting loop become frozen and can no longer be destroyed, namely by any means available to the driver, for example.

In the following, first, the kind, structure, and operation of the used acceleration sensor, in a preferred embodiment, is discussed.

Figure 2:
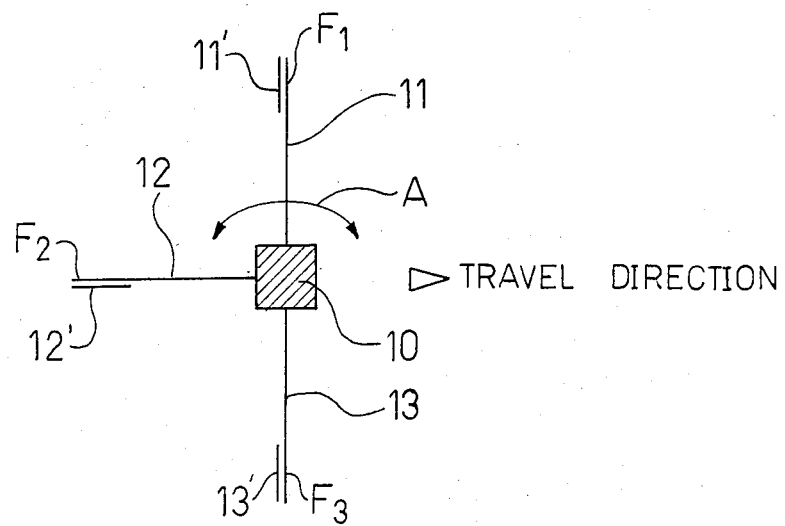
FIG. 2 is a schematic top plan view of the acceleration sensor employed in the present invention.

The underlying idea of an acceleration sensor shown by way of example in FIG. 2 is to design always one capacitor plate as a cantilever beam and to arrange it so that acting inertia forces are effective in the respective selected axis perpendicularly to the beam axis, with the capacitor forming a part of an electronic oscillator, otherwise of any circuit design, and being incorporated in the concept of the oscillator in a way such as to be at least co-determinative of the oscillation frequency of the oscillator. Then, the capacitance is obtained as a linear function of the respective varying deflections which depend on the bending forces, and, with a proper design of the oscillator, the capacitance variations become a linear function of the variation of the oscillation frequency.

In accordance with the simplified embodiment of FIG. 2, a central clamping body 10 is provided in which the cantilever beams in the form of flat tongues 11,12,13 are unilaterally fixed and which, preferably, is at the same time electrically connected to the tongues in such a way that the block of the clamping body is at the common zero potential of the circuitry in which the acceleration sensor is incorporated.

In the simplified embodiment of an acceleration sensor shown in FIG. 2 and provided particulaly for use in motor vehicles in association with a built-in short time accident data recorder, the tongues are provided in a single plane, mutually offset through 90°, which makes unnecessary to provide a capacitive sensor pointing in the travel direction. Three capacitives sensors F1,F2,F3 are thereby obtained, each formed by one of tongues 11, 12, 13 and one of opposing stationary counterplates 11', 12', 13' spaced apart by a predetermined distance, so that in rest position, capacitors with predetermined capacitances are obtained.

As soon as acceleration forces start acting on such an acceleration sensor comprising individual capacitive sensors, the individual tongues are deflected due to their inertia and change correspondingly their position relative to the stationary counterplates, with the result of changing the capacitance at the individual acceleration sensors due to the changed mutual spacing of the plates. With negative acceleration variations, which are defined as diminished mutual spacing of the plates forming a capacitor, the capacitance increases, and with positive acceleration variations, the capacitance decreases.

In accordance with a practical embodiment, the tongues which, preferably, have a throughout uniform cross section, may have a width of 1.4 cm, a length of 2 cm, and a thickness of 0.03 cm, and may be made of beryllium bronze, for example, or, to obtain a still lower dependency of temperature, of a material which is generally known under the designation Nivarox. If in such an emodiment the normal mutual spacing of the plates of each of the capacitance sensors F1, F2, F3 is 0.01 cm, with an overlap length of 0.8 cm, the values listed in the following table are obtained, it being assumed that the acting accelerations will range between −20 g and +20 g:

| b g | A outside mm | A medium mm | C $p^F$ | f Hz |
|---|---|---|---|---|
| −20.0 | 0.0600 | 0.0838 | 11.84 | 422084 |
| −10.0 | 0.0800 | 0.0919 | 10.79 | 463005 |
| −1.0 | 0.0980 | 0.0992 | 10.00 | 499834 |
| −0.5 | 0.0990 | 0.0996 | 9.96 | 501880 |
| −0.2 | 0.0996 | 0.0998 | 9.93 | 503108 |
| −0.1 | 0.0998 | 0.0999 | 9.93 | 503517 |
| +0.0 | 0.1000 | 0.1000 | 9.92 | 503926 |
| +0.1 | 0.1002 | 0.1001 | 9.91 | 504335 |
| +0.2 | 0.1004 | 0.1002 | 9.90 | 504745 |
| +0.5 | 0.1010 | 0.1004 | 9.88 | 505972 |
| +1.0 | 0.1020 | 0.1008 | 9.84 | 508018 |
| +10.0 | 0.1200 | 0.1081 | 9.17 | 544847 |
| +20.0 | 0.1400 | 0.1162 | 8.53 | 585768 |

It may be learned from the table that a basis oscillator frequency of about 503.926 kHz may be considered at the normal spacing (acting acceleration=0), with a corresponding linear and well evaluable frequency evaluation between 422.084 kHz g=−20 at 585.768 kHz at g=+20; the capacitance in pF then varies between 11.84 and 8.53 pF.

A torsion of the individual tongues or beams due to an angular acceleration, thus in the case of the acceleration sensor of FIG. 1, a rotary motion about an axis extending in the drawing plane approximately from above downwardly, produces no effect on the medium spacing of the capacitor plates from each other, since such a torsion of tongues 11 and 12 changes the mutual distance of the plates symmetrically at either side of the neutral axis, with the effect of a compensation.

Oscillation or vibration do not produce an effect of the average capacitance either, since even though capacitance variations superimposing on the respective oscillation or vibration frequency may occur, they cannot be done effectively beyond a period of at least 50 ms which is the integration time provided for evaluating the oscillation frequency.

Figure 3:
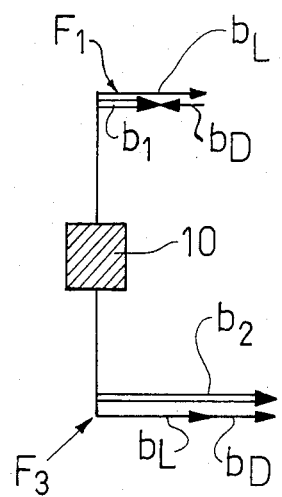
FIG. 3 is a diagram showing torsional accelerations which may be applied to the acceleration sensor of FIG. 2.

The diagrammatical showing of FIG. 3 serves the appreciation of torsional accelerations such as certainly may come to act on the acceleration sensor of FIG. 2 in the direction of double arrow A. With the assumption that a lengthwise acceleration $b_L$ acting in the travel direction is present, a torsional acceleration in a given direction produces the effect that in one of the capacitance sensors, namely F1, in the present example, the acting torsional acceleration $b_D$ is subtracted from the lengthwise acceleration $b_L$, while in the other capacitance sensor F3, it is added. In consequence, the two sensors F1 and F3 furnish data on converted resulting acceleration values of b1 for F1, and b2 for F3. Therefrom, the torsional accelerations can be computed from the following formula:

$$b_D = (b2 - b1)/2.$$

The also present lengthwise acceleration is given by the following formula:

$$b_L = (b2 + b1)/2.$$

Further, based on the resulting accelerations, the following may be stated as to the direction of the acting accelerations: If the result produced by the first formula relating to the torsional acceleration is positive, then the torsional acceleration acted counterclockwise, in the other instance clockwise. From the formula for the lengthwise acceleration, it results that with a positive value, the acceleration was in the travel direction, and with a negative value, it was a braking acceleration opposite to the travel direction.

In the example of FIG. 2, the capacitance sensor F2 extends in the travel direction; consequently, the capacitance variations measured therewith lead to the observation that, for example, with an acceleration acting to the right, considered in the travel direction, thus downwardly in the drawing plane, the acceleration indicated by the capacitance sensor F2 is positive, in the other instance negative. Sensor F2 of course is also responsive to torsional accelerations of the vehicle, however, in such a case, together with sensor F1 and F3, in the manner described above, so in instances where no torsional acceleration is indicated by sensors F1 and F3, an acceleration detected by sensor F2 was one to the left or to the right, considered in the travel direction.

The tongues producing by their inertia the capacitance variations F1, F2 and F3 can be manufactured with such high accuracy that an adjustment should be reduced only to the elimination of possible errors in mounting; within the required region, the matter constant E is independent of temperature and resistant to aging. The dielectric constant is also independent of temperature since the entire sensor arrangement is preferably accommodated in a housing under vacuum conditions.

Besides, it is advisable to design the oscillator circuit associated with each capacitance sensor with Schmitt triggers on the basis of the use of CMOS elements, which further reduces the temperature dependence; it is also advisable not to apply to the capacitors a too high operating voltage, but to use a dc voltage of 5 volts, for example, whereby the error caused by the forces of the electric field between the plates can be reduced to the order of magnitude of 0.1% and thus cease to be a disturbing factor.

Figure 4:
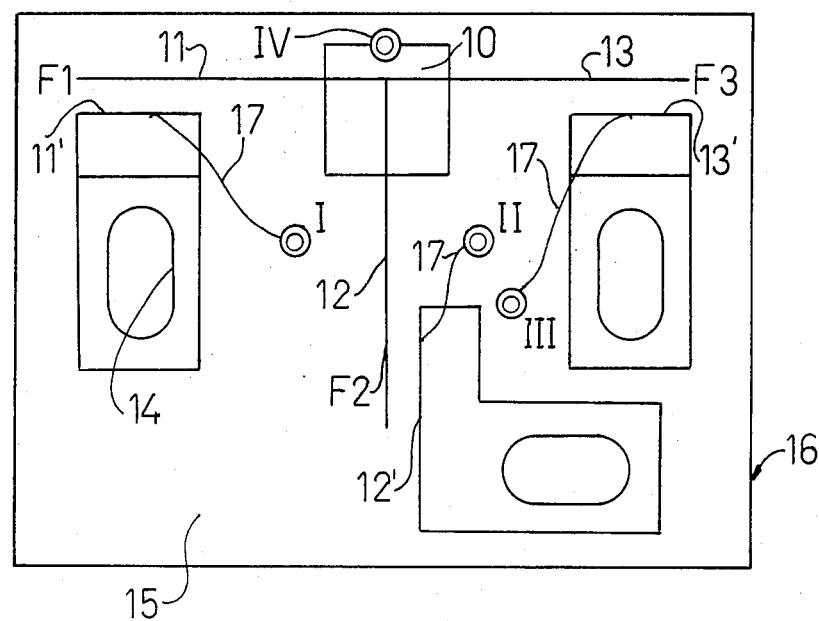
FIG. 4 is a top plan view of the acceleration sensor of the present invention.

A practical embodiment of an inventive acceleration sensor in a housing is shown in FIG. 4; the block-shaped clamping body 10 supports tongues 11,12 and 13 which are opposed by stationary counterplates 11',12' and 13'. The stationary plates forming the counter electrodes may be supported on guides which are secured through oblong slots 14 to the bottom plate 15 of the housing 16, so as to make them displaceable in the direction of the movable tongues, to adjust the initial capacitance. Each of counterplates 11', 12' and 13' is secured in place in insulated position and their connections are led out through low capacitance solid cables 17 to fixed terminal points I, II and III of the plate, with the common terminal point IV being formed the clamping body 10.

Figure 5:
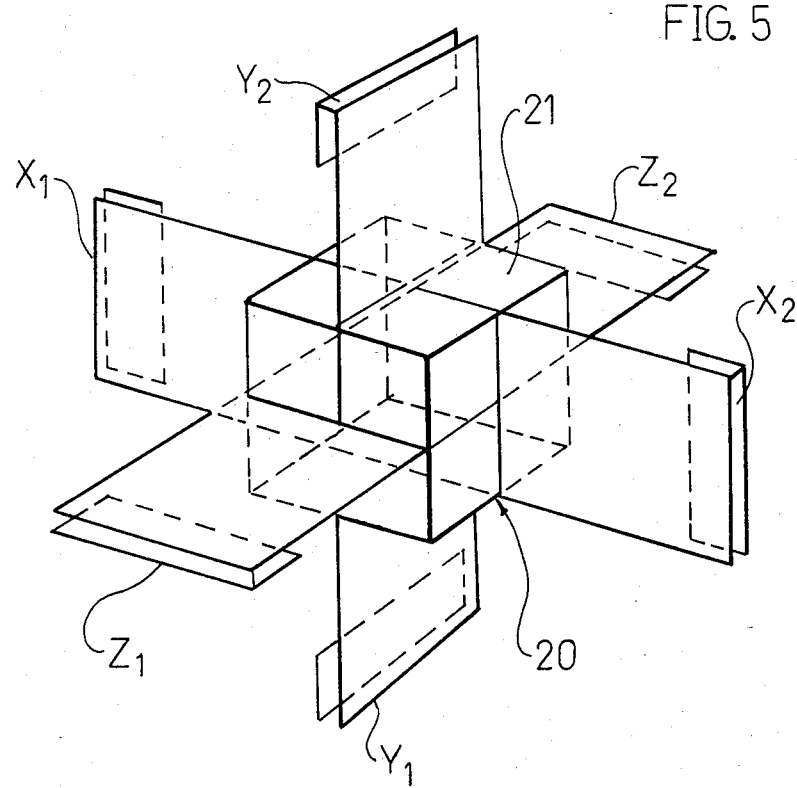
FIG. 5 is a perspective view of an acceleration sensor in accordance with the invention which is responsive to accelerations in any direction of linear displacement or rotation.

In the embodiment of FIG. 5, an acceleration sensor responsive to accelerations in any direction of linear displacement or rotation and generally designated 20 comprises a central clamping body 21 supporting individual tongues, and a total of six tongues which are arranged about and fixed to the cube-shaped clamping body in by 90° offset positions, and which, along with corresponding counterplates, form capacitance sensors X1, X2, Y1, Y2 and Z1, Z2. Each of these capacitance sensors forms a part of an oscillatory circuit and is therefore capable of detecting any action to which it is exposed and which results from a torsion or a linear acceleration in the positive or negative direction and of converting the capacitance variations and then making them evaluable in the form of a frequency variation. Thereupon, the individual values of the acting accelerations can be determined by forming the corresponding differential values, as demonstrated above in connection with FIG. 2.

The following schematic table shows the data sequences to be stored in chronological order, while taking into account that a data to be recorded of each function require unequal resolution times. Taking a minimum resolution time of 100 ms for the acceleration data, the same resolution, or a 500 ms resolution, may be used for the speed data. The status data also may be proportioned to these two categories. Then, the following data sequence are obtained in time intervals of 100 ms:

| 0 | 100 | 200 | 300 | 400 | 500 | 600 | 700 | ms |
|---|---|---|---|---|---|---|---|---|
| SZ | | | TZ | | | | EZ | |
| vl | vl | vl | vl | vl | vl | vl | vl | |
| bl | bl | bl | bl | bl | bl | bl | bl | |
| bq | bq | bq | bq | bq | bq | bq | bq | |
| bw | bw | bw | bw | bw | bw | bw | bw | |
| S.A. + B | S.A. | S.A. | S.A. + B | S.A. | S.A. + B | S.A. | S.A. | |

With the symbols to be understood as follows:

| SZ | start time | TZ | trigger time |
|---|---|---|---|
| EZ | rest time | vl | lengthwise speed |
| bl | lengthwise acceleration | bq | transverse acceleration |
| bw | torsional acceleration | S.A. | status A |
| S.B. | status B | | |

With the operational conditions and functions to be stored and taken here into account, the status data comprise a total of 13 bits, namely 6 bits for status A and 7 bits for status B.

According to FIG. 1, it should further be mentioned that in mechanical terms, the inventive accident data recorder comprises two sub-assemblies, namely the basic apparatus which, as a housing, is firmly built into the motor vehicle and provides for fitting, securing, and protection in the vehicle and at the same time, as far as necessary, accommodates structural elements of the status A and status B blocks 27, 28, as well as of the interface 24 and the tachogenerator, and a slide-in module, also termed storage cassette, designated 31 and framed by broken lines in FIG. 1. The storage cassette module is a compatible part permitting with a standardized slide-in opening in all basic apparatus, a simple change of individual storage cassettes and comprising the storages, thus the fixed storage 22 and the ring addresser 23 as well as the operational section (control logic with the time base) and the acceleration sensor. The accommodation of the acceleration sensor also in the storage cassette has the advantage that with the removal and later evaluation and due to the possible adjustment of the measuring properties, the calibration of the sensor and departures from the standard may properly be included in the evaluation of the data.

The following comments subdivided in sections with corresponding captions is a more detailed explanation of the individual operations and relations, and complements the concept illustrated by FIG. 1.

Time of Putting into Operation

The first data entered into the fixed storage area of the RAM are the time of putting into operation, the serial number of the receiving apparatus, and the vehicle data. At the same time the time counter is set to zero and the timing is released.

Start of Travel

Every recording cycle starts with the entry of the actual time of the system. What is defined as the start of travel is:

(a) the ignition is on—signal from the ignition block 29
(b) the pulse transmitter of the tachogenerator (travel or wheel revolution sensor 25) delivers pulses in predetermined maximum intervals. With the first data sequence to follow, the start time SZ is entered.
(c) a lengthwise acceleration is detected.

End of Travel

The end of travel is interpreted as stoppage of the vehicle defined by (a) the absence of the tachogenerator pulses within a predetermined time interval, and
(b) the vehicle stoppage simultaneously computed from the b-t function, such as continuous integration of acceleration with respect to time;
(c) zero values of the accelerations.

As soon as all the conditions are satisfied, the stoppage time in entered with the last data signals as the actual system time.

After-travel Time

Upon entering the end of travel time, the ring addresser defines the next recorder loop by counting up the addresses. Then, in this secondary loop, zero data are entered in a normal case. This method makes it possible at a following collision to instantaneously close a new recording and prevents the data of the primary loop from being overwritten with zero data. This after-travel time amounts to about three minutes with the vehicle stopped. Consequently, if during this safety or after-travel time no new trigger event occurs, the data within the range of the ring counter will later be overwritten. If a new trigger event occurs during the safety time, the address offset is moved up and a new sequence with the entry of the trigger time is started.

Trigger Time

The trigger time is the system time relative to which a definite trigger event is defined as an accident which has occurred and the process of associating the primary storage with the basic storage area is released and thus the data in the storage loop are secured.

This system time may additionally be entered, as a three byte word, for example, in the sequence following the trigger event and forms within a recording the reference to other storages. In an evaluation of the driver's behavior, this time fixes the starting point for a detailed resolution of the happening. All the fixed points of secondary definition are computed from this point of time, and relations between two corresponding storage systems may be established as soon as corresponding points of correlation within the storage extension are determined.

The trigger operation may be schematically outlined as follows:

| T | | | | E | | | | |
|---|---|---|---|---|---|---|---|---|
| 1 | 2 | 3 | 4 | 5 | 6 | 7 | 8 | 9 |
| 20 | | | Ring Addresser Range | | | | | 10 |
| 19 | 18 | 17 | 16 | 15 | 14 | 13 | 12 | 11 |

The data sequence starts with the trigger time which is incorporated into the normal data sequences additionally. The trigger bit is recorded in address 1, storage locations 2 to 20 contain the last data spanning 60 seconds, as agreed. Depending on the further development of the travel, the ring addresser addresses are counted up and the data are thus secured. Let it be assumed as example that at storage location 5 stopping is registered. Instantly, a new cycle of the ring addresser is defined by the range 21 to 41.

The starting point is that in a normal case, a vehicle has stopped 30 second at the latest after a trigger event. The speed computation and the measured data delivered by the pulse transducers agree in the stoppage; the ring counter addresses are now counted up by a sequence width. There, in a normal case, the secured data comprise about 40 seconds of pre-trigger data and 20 seconds of past-trigger data.

Follow-up Accident

If after each trigger event a full recording sequence is secured, then, in a most unfavorable case, a follow-up collision after a collision accident and stoppage may claim the second storage sequence and thus secure up to 50 seconds of zero data. The invention reliably avoids this through a dynamical determination of the shift constant for the ring storage (ring addresser), by disregarding empty storage locations and taking pre-trigger data only up to the start time. Consequently, as a rule, an urban accident will require less than 60 seconds and a follow-up accident not more than 10 to 20 seconds of recording, so that the available storage volume is best utilized.

Real Time

The real time is the absolute system time recomputed to the synchronizing time mark, and if relative data are required from a plurality of systems, namely if more than one motor vehicle participated in the accident, the relative time error of the different systems may be eliminated by a conversion to the time of the receiving system. A residual uncertainty in time may be due to an inaccuracy in the operation of the time base during the reception time difference of two systems. Since the involved time intervals are relatively short, the residual error is negligible.

Measuring of the Vehicle Speed and Traveled Distance

Pulses synchronous with the speed can be derived from an end stage of the transmission through a step-up gearing for the tachometer. It is advisable to design a pulse generator to the effect that a constant number of pulses is produced for every meter of the wheel circumference, so that the recordings in all the systems are comparable with each other without corrections. If the number of pulses produced within a predetermined interval is stored, then the distance traveled during that interval stands in the storage independently of the type of the vehicle.

If an anti-block system is employed, the measurement or evaluation of rotationally synchronous pulses may be provided directly on the wheel of the vehicle.

Measuring of Acceleration

The facts relevant to the evaluation of an accident mainly relate to the movements of the vehicle which, in turn, result from accelerations to which the vehicle is subjected. The type and design of an acceleration meter for any imaginable acceleration has been discussed above; thus, in addition to the standard travel speed determination, recording of the lengthwisde acceleration is another means for determining the instantaneous value of the travel speed, by integrating the b-t function within the desired time interval. Both these measuring methods complement each other without a gap, since always when one of them does not longer furnish reliable measured values, the other operates in the optimal region.

Let us take a first example where the vehicle brakes with the wheels locked. The travel speed values derived from the rotation of the wheels are zero. The acceleration, however, has now a value which is well determinable, namely near the maximum in normal travel.

As a second example, be it assumed that the vehicle moves at a constant speed. The travel speed value computed from the speed of the wheels optimally agree with the actual travel speed, since the wheels run without sliding. The acceleration values are zero. Therefore, the inventive acceleration sensor permits even in critical regions a collection of the conventionally determined speed values and steps in as substitute as soon as wheel locking prevents a further speed determination or transverse impacts cannot be picked up because of the ineffectiveness of the wheel movements in this direction.

Data Packing

An emergency operation with a filled-up storage is possible if the bulk of the data of the respective oldest recorded event is reduced to substantial data. This selection may follow predetermined criteria, such as a reduction to data between the standstill and ten seconds before the trigger event. In such an instance, the required maximum storage area per event would amount to only about 20 seconds or 33%.

Power Failure Through Sabotage

Basically, a disconnection of the accident data recorder from the power supply can be prevented only if the result is that at least one function necessary for the operation of the motor vehicle is stopped. Since simple interruptions may be bridged by the accident data recorder, it is advisable, for example, to let an electronic circuit of the engine continuously interrogate the operating condition of the accident data recorder and stop its function if the recorder fails to respond. By sabotage, a condition may be understood in which the ignition is on, but the accident data recorder remains powerless at least for one minute. Such a condition may be indicated by an acoustic of optical signal and will be entered and secured in the storage area as outage time.

Preferred Embodiment

In the following, the particular design and operation of a preferred embodiment and of further advantageous embodiments of the invention are discussed.

Upon substituting the term microprocessor 21/23, for the terms control logic circuit and ring addresser used above in connection with FIG. 1, a ring addresser in its hardware designation becomes an illustration of basic operational sequences in a microprocessor. Under the control of central clock pulses representing timing of the microprocessor system and derived from the quartz time base 21a, such a microprocessor 21/23 with the associated fixed storage 22 operates as described hereinafter, where advantageous embodiments are mentioned at the same time. Microprocessor 21/23 of the accident data recorder operates permanently, thus also with the vehicle stopped or parked. The slightly higher power input, if any, might be corrected by correspondingly designed, for example CMOS base, microprocessors.

Measurements relating to the speed and accelerations, and to the status values of the vehicle are also made continually, their recording, however, is effected only with the vehicle in motion. A standstill of the vehicle does not even stop the computations of the microprocessor which must be done, for example, by corresponding logic operations on the output of b sensors 26, i.e. the measured linear or torsional accelerations, to detect a trigger event caused by an accident. A particularly advantageous feature of the present invention is that after each stop of the vehicle, a computation is started determining the respective actual stoppage time, thus, a counter is started, for example by the quartz controlled timing pulses of the system. As soon as the vehicle moves again, the new data recording sequence starts with the entry of this reached count of the counter, which insofar represents only a single value and defines the starting mark for the now commencing entry of next data, for example in 100 ms intervals, to a closed loop in storage 22. In other words, by simply forming increments or decrements, the microprocessor counts or defines storage areas (addressing) defining a storage loop as a cyclically circulating simple counter loop, into which the measured data are entered. (the computed data need not be entered since they can be computed therefrom anytime later again). As soon this (primary) counting loop reaches a predetermined value, it jumps back again to the starting address and the data earlier entered in this storage loop are overwritten. With the vehicle remaining in motion, such a simple primary counting loop may receive data for one minute, for example. However, if empty time periods occur through intermediate stoppage, leading to corresponding empty data, the actual stoppage times are determined by the above-mentioned counting process, so that due to this operational precaution, the travel data contained in the storage are not overwritten by the following empty data if, for example, stops at traffic lights are concerned. It will be understood that in such an instance, substantially more data may be written, and insofar packed, onto a storage loop receiving travel data for the duration of one minute.

The interface circuit for the accleration or travel sensors may comprise, for example, four buffered counters, i.e. counters having their outputs applied to a bus through a buffer. The microprocessor interrogates these counter counts in accordance with its program, upon having caused itself a counter stop in advance. Immediately after the interrogation, the respective counters for the acceleration and travel sensors are reset and restart their counting. In the meantime, namely at the here assumed 100 ms spacing of the respective data entries, the microprocessor has enough time to compute an accident-caused trigger event by suitably interconnecting the measured data with the interrogated ones. Such a trigger event is given, of course, any time one of the measured acceleration values of itself exceeds a predetermined threshold value. In addition thereto, the microprocessor of course computes resulting values from the measured lengthwise and transverse accelerations and may detect an accident-caused trigger event even if the individual acceleration values were not excessive. The determination of the torsional acceleration is a simple subtraction, as already mentioned above, and an angular acceleration can correspondingly be computed by means of an algorithm. In addition to the detection of a trigger event, by which basically another function of the microprocessor explained hereinafter is started, the following is to be noted. The invention makes possible with a high security also to investigate purely personal accidents, since the determined data can be weighted. For example, the microprocessor may detect a trigger event by computation if the lengthwise accleration reaches a certain value which may be far below an assumed threshold, but at which the brake has not been actuated. Therefrom, a personal accident may be inferred. Similarly, by corresponding waiting, additional variations in acceleration occurring at a full brake actuation and which can be defined as impacts suffered by the motor vehicle hitting an obstacle with fully actuated brakes, may be evaluated as a trigger event.

Upon an occurrence of such a trigger event, always two cases may be distinguished.

If the speed does not decrease up to a final stop, it may be inferred therefrom that this is a hit-and-run offense, and the microprocessor, even though the vehicle does not stop, leaves the primary data entry loop of itself, thus causes stepping up of the starting address of the recorder by a complete offset of the (primary) storage loop, that is, and this goes for any occurrence of a trigger event, either counted back to the last stop of the vehicle, (data volume between two start marks, so that always only the data relevant to the respective accident are secured and the available storage area can be best utilized) or, if the time elapsed since the last stop is longer than than provided for the primary counting loop (one minute), just the freezing of this one-minute storage loop due to the fact that the microprocessor now works with the new starting address increased by the complete offset.

In this way, the so called leading or trailing times need no longer be determined, thus taken into account, and additional recording (of follow-up accidents) is made possible.

On the other hand, if after the detection of a trigger event the vehicle stops, as is usual, the recordal stops with the stopping of the vehicle, the new starting address is defined, maybe the zero frequencies of the accleration transmitters are entered with the offset, and the counting is started to be able, at any rate of time as well immediately be explained, to establish a relation to the absolute time.

A third possibility of storing accident data up to their evaluation, even without any computation or detecting of a trigger event by the microprocessor, results from the advantageous basic concept of the present invention, namely that upon an accident, if this accident, for example, only relates to persons and/or the collision with a maybe only very small obstacle has so small consequences that the computer cannot detect a trigger event, the entered data do remain stored because, as already mentioned above, at every stop, and such a stop occurs, assumed that the happening is normal, at every accident due to the driver's reaction, the further picked up (measured) data are no longer taken up by the storage but this actual stop time is recorded through the starting of a new counter.

Therefore, if the person involved in the accident looks after removing the storage cassette after such an accident experienced by himself, then the data proving his innocence may not be lost. They are recorded in the (primary) storage loop, along with the time elapsed since the stop of the vehicle, so that also a gap-free relation to the absolute time can be established.

The further procedure is that the storage cassette which, in the preferred embodiment, also comprises the time base, the microprocessor depending on the clock rate of the system, and at least the acceleration sensors, is removed for evaluation. During this removal, the counter which has been started for determining the stoppage time continues to run. If the storage cassette is then read in an evaluating station, which is preferable, the computer of the evaluating station stops the time counter, and the absolute time, which of course is available at the evaluating station, and the count of the time counter are added to the readout data. Due to this possibility of retrogressive computation including the count of the stoppage time counter, a gapless relation to the absolute time can be established, of course, with all the time counters becoming reduced to the (very small) inaccuracy of the quartz time base of the accident data recorder during the time of counting. In this way, it is possible to bring any number of independent accident data recorder storages directly into mutual relation, since all the storages contain a common time mark. By determining the inaccuracy of the quartz time base of each accident data recorder while reading it out, even the minute relative inaccuracy can be reduced to zero. Therefore, even accidents which happened several weeks ago and were hit-and-run accidents, wherefore the storage cassette would not be evaluated immediately, may be determined, since with such an accident, due to the reaction of the microprocessor to the trigger event it has detected, both the counter loop is newly defined by the complete offset, as in any trigger event, i.e. the starting address is correspondingly increased so that the accident data recorder now runs in a secondary counting loop, and simultaneously a time count is started which will no longer be stopped and occupies a single storage location in the fixed storage. The microprocessor with the fixed storage may further be so organized that even with a cyclic counting loop, intermediate stops are recorded in the secondary (new) storage loop again by corresponding parallel counting under the same clock rate.

Due to the continuous operation of the microprocessor and the measurement and computation of the incoming data, accidents occurring to a standing or parked vehicle can also be found out, of course, since as soon as one of the b sensors furnishes values which depart from its zero frequency, such as upon a collision with a vehicle at standstill, the received signals are of course interpreted by the microprocessor as a movement of the vehicle and after entering the reached count of the timer counter (for the stop time), a new recording frequency is started. As soon as the colliding parked vehicle thus comes to a standstill again, this is interpreted as a new stop of the vehicle and the counting is restarted, so that anytime the data leading to the collision can be determined if such an accident is later noticed and the storage cassette is submitted to evaluation. Even the absolute point of time of the accident damaging the vehicle can still be determined.

I claim:

1. A method of recording and storing vehicle data representing events and conditions relating to an accident of a motor vehicle having wheels that normally revolve with longitudinal travel of the vehicle and which is subjected to at least one of longitudinal, transverse and rotational acceleration during an accident, comprising:

generating a wheel revolution signal corresponding to revolutions of a wheel of the vehicle;

providing an acceleration sensor having at least three cantilever mounted tongues each acting as a movable plate of a capacitor, and a fixed capacitor plate for each tongue which is fixed with respect to the vehicle, two of said tongues lying in a common plane transverse to the direction of longitudinal travel of the vehicle, and the remaining tongue lying in a plane extending in the direction of longitudinal travel, said movable plates being movable toward and away from said fixed plates when the vehicle is subjected to longitudinal, transverse and rotational accelerations to change capacitance between said fixed and movable plates, said sensor including an oscillator circuit for each set of fixed and movable plates which produces frequency variation with a capacitance for each set of fixed and movable plates, said frequency variations comprising acceleration signals which are indicative of longitudinal, transverse and rotational accelerations of the vehicle;

generating a plurality of additional data signals corresponding to additional conditions of the vehicle;

continuously generating central timing pulses indicative of the absolute passage of time;

subjecting said revolution signal and said acceleration signals to an analog-to-digital conversion to form digital revolution data and digital acceleration data corresponding to the revolution and acceleration signals;

writing the digital revolution data, the acceleration data and the additional data signals into a sequence of data storing locations of a fixed storage at intervals timed by the central timing pulses, the locations being disposed in a primary storage loop having a beginning and an end, with the data being stored in sequential locations from the beginning to the end of the primary loop and then back into the beginning of the primary loop;

generating a trigger event when an accident occurs; and after the occurrence of the trigger event, writing additional revolution data, acceleration data and data signals which occur after the trigger event, into a secondary loop of storage locations having a new starting address in the fixed storage so that data remains stored in the primary loop and additional data after the trigger event becomes stored in the secondary loop.

2. A method according to claim 1, including, upon a vehicle stop and with the vehicle at standstill, interrupting the sequence of data storing at the locations of the fixed storage, starting a counting process using a counter to determine the actual stop time, and with a renewed motion of the vehicle, starting a new recording sequence with the count of the counter entered as a start mark for the new sequence.

3. A method according to claim 2, wherein the central timing pulses of the system controlling the data movement and the counting, are predetermined by a quartz time base.

4. A method according to claim 3, wherein by comparing measured acceleration data of lengthwise and transverse acceleration and computerized acceleration data resulting from the lengthwise transverse and angular acceleration, and comparing these with threshold values thereof, the trigger event related to an accident is determined, and including defining a new starting address for the new secondary loop of storage locations, that is offset from the primary storage loop, all the vehicle data after the trigger event being recorded in the secondary storage loop.

5. A method according to claim 1, wherein at the occurrence of a trigger event, a stored data volume of the primary loop is used as the secondary loop.

6. A method according to claim 2, wherein upon each trigger event without a vehicle stop or with a subsequent start of the vehicle, the counting of time starts with a system clock based counting up of a storage location in the fixed storage and continues until a storage cassette inclusive of the time base, the fixed storage, and the acceleration sensor, have been read out for evaluation and the reached count has been brought in relation with an absolute time of the evaluation, to the effect that at the instant of evaluation, the occurrence of the trigger event is determined in absolute time without any gap.

7. A method according to claim 1, wherein to automatically calibrate the acceleration sensor, the respective actual zero frequencies are written into the storage at every start of the vehicle and start of recordation.

8. An accident data recorder for recording and storing data representing events and conditions relating to an accident of a motor vehicle having wheels that normally revolve with longitudinal travel of the vehicle and which is subjected to at least one of longitudinal, transverse and rotational accelerations during an accident, comprising:

a revolution signal generator operatively connected to one of the wheels for generating an analog revolution signal representing rotation of the wheel;

an acceleration sensor including at least three cantilever mounted tongues forming movable plates of three capacitors, three fixed plates each associated with one movable plate, and a plurality of oscillator circuits each connected to one of the sets of fixed and movable plates and generating a frequency which varies with movement toward and away from each other as each set of movable and fixed plates, which movement indicates accelerations on said acceleration sensor, said frequency variations comprising analog acceleration signals;

analog-to-digital conversion means connected to said revolution signal generator and said acceleration sensor for receiving said revolution signals and said acceleration signals and converting them into digital revolution and acceleration data;

a central clock for generating pulses indicative of the passage of time;

additional condition sensing means for generating additional data indicative of additional conditions of the vehicle;

a fixed storage having a plurality of digital storage locations;

a ring addresser connected to said fixed storage for establishing and cycling through loops of storage location, said ring addresser writing data into each storage location of a loop from a starting point of the loop to an ending point of the loop and then back to the starting point of the loop;

trigger means for generating a trigger event upon the occurrence of an accident; and control logic means connected to said conversion means, said additional condition sensing means, said central clock and said ring addresser, said control logic means receiving data and controlling said ring addresser to write data in sequence into successive storage locations of a primary loop in the fixed storage, said control logic means controlling said ring addresser, upon the occurrence of a trigger event, to expand from a primary loop into which data was written before the trigger event, into a secondary loop having storage locations into which data after the trigger event is written, data in the primary loop being retained after the trigger event, all writing of data by said ring addresser into the storage locations of the fixed storage being timed by said central clock.

9. An accident data recorder according to claim 8, including counting means for counting pulses of said central clock, said central clock comprising a quartz timer, said control logic means sensing data indicating the vehicle has stopped and, when the vehicle has stopped, activating said counting means to count pulses after the vehicle has stopped up to a point where the vehicle is started again, a count of the counting means when the vehicle has started again being stored in said fixed storage in one of said storage locations as a starting mark for a new cycle in a storage loop of the fixed storage.

10. An accident data recorder according to claim 8, wherein some of said additional conditions sensed by said additional condition sensing means are conditions which change relatively slowly and other conditions are conditions which change relatively quickly, data of said conditions which change relatively slowly being written by said ring addresser at a slower rate as controlled by said central clock than data on conditions which change more quickly.

11. An accident data recorder according to claim 8, wherein said acceleration sensor, said central clock, said fixed storage, said ring addresser and said control logic means are all mounted on a single storage cassette and are removable from the vehicle as a unit, said accident data recorder including an interface connected to the vehicle and connectable with the storage cassette, said interface being connected to said additional condition sensing means and said revolution signal means.

12. An accident data recorder according to claim 8, wherein said acceleration sensor comprises a body fixed to the vehicle, each of said tongues being cantilever mounted at one end thereof to said body, each tongue having an opposite end forming said movable capacitor plate, two of said tongues lying in a common plane extending transverse to a travel direction of the vehicle and another of said tongues extending in the travel direction, said fixed plates each being fixed with respect to the body.

13. An accident data recorder according to claim 12, including an evacuated housing, said body, tongues and fixed plates being disposed in said body.

14. An accident data recorder according to claim 13, wherein said housing includes a bottom plate, each of said fixed plates being mounted for adjustable spacing to said bottom plate with respect to each respective movable plate for adjusting a distance between sets of movable and fixed plates to change an initial capacitance therebetween.

* * * * *